(12) United States Patent
Gan

(10) Patent No.: US 12,729,145 B2
(45) Date of Patent: Sep. 8, 2026

(54) PRODUCTION DEVICE FOR pH/REDOX POTENTIAL-ADJUSTED WATER

(71) Applicant: KURITA WATER INDUSTRIES LTD., Tokyo (JP)

(72) Inventor: Nobuko Gan, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 425 days.

(21) Appl. No.: 18/026,787

(22) PCT Filed: Sep. 22, 2021

(86) PCT No.: PCT/JP2021/034814

§ 371 (c)(1),
(2) Date: Mar. 16, 2023

(87) PCT Pub. No.: WO2022/102252

PCT Pub. Date: May 19, 2022

(65) Prior Publication Data

US 2024/0025785 A1 Jan. 25, 2024

(30) Foreign Application Priority Data

Nov. 13, 2020 (JP) ................................ 2020-189189

(51) Int. Cl.
*C02F 1/20* (2023.01)
*C02F 1/00* (2023.01)
(Continued)

(52) U.S. Cl.
CPC ................ *C02F 9/00* (2013.01); *C02F 1/008* (2013.01); *C02F 1/20* (2013.01); *C02F 1/66* (2013.01);
(Continued)

(58) Field of Classification Search
CPC .... C02F 9/00; C02F 1/008; C02F 1/20; C02F 1/66; C02F 1/685; C02F 2103/04;
(Continued)

(56) References Cited

U.S. PATENT DOCUMENTS 6,290,777 B1 * 9/2001 Imaoka ..................... B08B 3/08 257/E21.228
11,198,626 B2 * 12/2021 Masaoka ................ B01F 25/50
(Continued)

FOREIGN PATENT DOCUMENTS

CN 111132939 A * 5/2020 ................ C02F 1/70
JP 2000216130 A 8/2000
(Continued)

OTHER PUBLICATIONS

English translation of JP2008086879A, published Apr. 17, 2008. (Year: 2008).*

(Continued)

*Primary Examiner* — Joseph W Drodge
(74) *Attorney, Agent, or Firm* — Element IP, PLC

(57) ABSTRACT

A production device for pH/redox potential-adjusted water (1) of the present invention includes a platinum group metal-supporting resin column (3) that is provided in a supply line (2) of ultrapure water (W) and a pH adjuster tank (4) and a redox potential adjuster tank (5) that are provided downstream the platinum group metal-supporting resin column (3). A membrane-type degassing device (6) is provided downstream them, and a gas-dissolving membrane (7) is disposed downstream the membrane-type degassing device (6). A cleaning water quality monitoring mechanism including a pH meter, an ORP meter, and an inert gas concentration measuring means is provided downstream the gas-dissolving membrane (7) of the supply line (2). The cleaning water quality monitoring mechanism is connected to a control (Continued)

means (not illustrated). The control means is capable of controlling a pump (4B) of the pH adjuster tank (4), a pump (5B) of the redox potential adjuster tank (5), and the gas-dissolving membrane (7) based on the measurement values of the cleaning water quality monitoring mechanism. With such a configuration, the present invention can suppress dissolution of metals to a minimum level in a rinsing step for the surfaces of wafers on which chromium group elements are exposed.

5 Claims, 3 Drawing Sheets

(51) Int. Cl.

| | |
|---|---|
| ***C02F 1/66*** | (2023.01) |
| ***C02F 9/00*** | (2023.01) |
| *C02F 1/68* | (2023.01) |
| *C02F 103/04* | (2006.01) |

(52) U.S. Cl.
CPC .......... *C02F 1/685* (2013.01); *C02F 2103/04* (2013.01); *C02F 2209/001* (2013.01); *C02F 2209/04* (2013.01); *C02F 2209/06* (2013.01)

(58) Field of Classification Search
CPC ............ C02F 2209/001; C02F 2209/04; C02F 2209/06; C02F 1/722; C02F 1/42; C02F 1/444; C02F 1/68; C02F 1/70; C02F 1/78; C02F 2103/346; C02F 1/28; C02F 1/58; C02F 1/686; C02F 1/72; C02F 2209/40; C02F 2301/046; C02F 2303/18; C02F 2303/185; B01D 61/00; B01D 19/00; B01D 19/0005; B01D 19/0031; B01D 19/0036; B01F 23/09; B01F 23/2319; B01F 23/45; B01F 25/311; B01F 35/2132; B01F 35/214; B01F 35/221; B01F 35/717; B01F 35/71745; B01F 35/7176; B01F 2101/305; B01J 20/0225; B01J 39/02; B01J 41/02; H01L 21/304; B08B 3/10; B08B 3/12
See application file for complete search history.

(56) References Cited

U.S. PATENT DOCUMENTS

| | | | | |
|---|---|---|---|---|
| 11,325,851 | B2 * | 5/2022 | Fujimura | B01D 61/00 |
| 11,339,065 | B2 * | 5/2022 | Gan | C02F 1/58 |
| 2003/0082865 | A1 * | 5/2003 | Takahashi | H10D 84/0144 257/E21.228 |
| 2003/0132104 | A1 * | 7/2003 | Yamashita | C02F 9/00 204/252 |
| 2011/0042281 | A1 | 2/2011 | Tokoshima et al. | |
| 2016/0233082 | A1 | 8/2016 | Yano et al. | |
| 2020/0017384 | A1 | 1/2020 | Fujimura et al. | |
| 2020/0048116 | A1 | 2/2020 | Gan et al. | |
| 2022/0242760 | A1 | 8/2022 | Hino | |

FOREIGN PATENT DOCUMENTS

| | | | | | |
|---|---|---|---|---|---|
| JP | 2008086879 | A | * | 4/2008 | |
| JP | 2009219995 | A | | 10/2009 | |
| JP | 6299912 | B1 | | 3/2018 | |
| JP | 6299913 | B1 | | 3/2018 | |
| JP | 2019147112 | A | | 9/2019 | |
| KR | 19990029925 | A | * | 4/1999 | C02F 3/308 |
| WO | WO-2015045975 | A1 | | 4/2015 | |
| WO | WO-2018179493 | A1 | * | 10/2018 | B01D 19/00 |
| WO | WO-2020250495 | A1 | | 12/2020 | |

OTHER PUBLICATIONS

English translation of WO2018179493, published Oct. 4, 2018. (Year: 2018).*

English translation of CN_111132939_A_1, published May 8, 2020. (Year: 2020).*

English translation of KR_19990029925_A, published Apr. 26, 1999. (Year: 1999).*

International Search Report issued Nov. 22, 2021 in PCT/JP2021/034814 (with English translation), 6 pages.

Office Action issued Nov. 16, 2021 in Japanese Patent Application No. 2020-189189 (with English translation), 8 pages.

* cited by examiner

PRODUCTION DEVICE FOR pH/REDOX POTENTIAL-ADJUSTED WATER

TECHNICAL FIELD

The present invention relates to a production device for pH/redox potential-adjusted water used as cleaning/rinsing water or the like in the field of electronic industry, etc. and relates particularly to a production device for pH/redox potential-adjusted water that produces cleaning water capable of minimizing, in a cleaning/rinsing water step for semiconductor wafers on which chromium group elements such as molybdenum are partially or entirely exposed, the charging of wafers and the corrosive dissolution of chromium group elements.

BACKGROUND ART

Production steps for semiconductors, etc. may include a rinsing step for cleaning the semiconductor wafer surface using ultrapure water as the cleaning water in order to keep the wafer surface clean. The higher the purity of the ultrapure water used in the rinsing step, the higher the specific resistance value, but the use of ultrapure water having a high specific resistance value may cause static electricity to occur during the cleaning, leading to electrostatic breakdown of insulating films and reattachment of fine particles. Accordingly, a method of dissolving a very small amount of carbon dioxide gas or ammonia in ultrapure water to lower the specific resistivity of the cleaning water is generally used.

SUMMARY OF THE INVENTION

Problems to be Solved by the Invention

Ultrapure water, however, contains hydrogen peroxide that is generated during the production process. In general, ultrapure water or cleaning water obtained by dissolving carbon dioxide gas in ultrapure water is sent to a cleaning machine through a pipe made of PFA (tetrafluoroethylene/perfluoroalkoxyethylene copolymer resin), but the PFA pipe has high gas permeability, and the dissolved oxygen concentration in the cleaning water at the nozzle outlet of the cleaning machine is higher than that at the outlet of an ultrapure water production facility or at the outlet of a cleaning water production device. The ultrapure water or cleaning water therefore contains not only hydrogen peroxide but also dissolved oxygen. If such ultrapure water or cleaning water is used to clean wafers on which chromium group elements such as molybdenum are partially or entirely exposed on the wafer surface, a problem may arise in that the chromium group elements exposed on the wafer surface are corroded by the hydrogen peroxide and dissolved oxygen contained in the ultrapure water or cleaning water and the semiconductor performance will deteriorate.

Conventionally, therefore, a dilute ammonia solution obtained by dissolving a very small amount of ammonia in ultrapure water or carbonated water obtained by dissolving $CO_2$ in ultrapure water has been used, for example, as the cleaning water for semiconductor wafers on which chromium group elements such as molybdenum are exposed on the wafer surface. However, the pH of the cleaning water varies depending on the type of added material, so when the dilute ammonia water, which exhibits alkaline properties, is used as the cleaning water, it is possible to prevent static charge of semiconductor wafers, but there is a problem in that corrosive dissolution of chromium group elements (molybdenum) may occur. On the other hand, carbonated water, which exhibits acidic properties, is produced by dissolving carbon dioxide gas in ultrapure water and therefore contains hydrogen peroxide generated during the process of producing ultrapure water. Furthermore, since the produced carbonated water is sent through a PFA pipe having gas permeability, the dissolved oxygen concentration in the carbonated water at the nozzle outlet of a cleaning device is higher than that at the outlet of the production device by several tens of ppb. In addition, once the cleaning water exits the nozzle of the cleaning machine, it is exposed to the atmosphere, so the dissolved oxygen concentration of the cleaning water greatly increases before it contacts the wafer. Thus, the effect of carbonated water to suppress dissolution of molybdenum is insufficient, and the development of cleaning water that is more effective in suppressing the dissolution is expected.

The present invention has been made in view of the above problems, and an object of the present invention is to provide a production device for pH/redox potential-adjusted water that can not only control the pH/redox potential of cleaning water but also prevent static charge of wafers by suppressing the hydrogen peroxide contained in the cleaning water and the dissolved oxygen concentration, which increases when sending the cleaning water, to an extremely low level and that can also suppress the dissolution of metals to a minimum level in a rinsing step for the surfaces of semiconductor wafers on which chromium group elements such as molybdenum are partially or entirely exposed.

Means for Solving the Problems

In view of the above object, the present invention provides a production device for pH/redox potential-adjusted water that produces adjusted water having desired pH and redox potential by adding a pH adjuster and a redox potential adjuster to ultrapure water, comprising: a hydrogen peroxide removal mechanism provided in an ultrapure water supply line; a pH adjuster addition mechanism and a redox potential adjuster addition mechanism that are provided downstream the hydrogen peroxide removal mechanism; a degassing mechanism provided downstream the pH adjuster addition mechanism and/or the redox potential adjuster addition mechanism; and an inert gas dissolution mechanism provided downstream the degassing mechanism (Invention 1).

According to the invention (Invention 1), by passing the ultrapure water from the ultrapure water supply line through the hydrogen peroxide removal mechanism, a trace amount of hydrogen peroxide contained in the ultrapure water is removed to lower the redox potential, and subsequently the pH adjuster is added to obtain a desired pH and the redox potential adjuster is added to prepare the pH/redox potential-adjusted water. For this operation, by providing the degassing mechanism downstream the pH adjuster addition mechanism or the redox potential adjuster addition mechanism, the dissolved gas in the pH/redox potential-adjusted water as the cleaning water is removed as much as possible, and then the inert gas can be dissolved in the pH/redox potential-adjusted water to stabilize the properties of the pH/redox potential-adjusted water. Through these operations, it is possible to produce the pH/redox potential-adjusted water capable of preventing the static charge of wafers and suppressing as much as possible the dissolution of chromium group elements such as molybdenum that are partially or entirely exposed on the wafer surface.

In the above invention (Invention 1), the production device for pH/redox potential-adjusted water may preferably include a cleaning water quality monitoring mechanism for monitoring the pH and redox potential of the pH/redox potential-adjusted water and a control means that controls the pH adjuster addition mechanism and the redox potential adjuster addition mechanism based on a measurement value of the cleaning water quality monitoring mechanism (Invention 2).

According to the invention (Invention 2), on the basis of the measurement results of the pH and redox potential of the pH/redox potential-adjusted water measured with the cleaning water quality monitoring mechanism, the control means can control the additive amounts of the pH adjuster and the redox potential adjuster so that, for example, the pH and the redox potential become those that do not cause the corrosion of chromium group elements such as molybdenum, thereby eliminating the influence of dissolved hydrogen peroxide in the raw water, and it is thus possible to produce the adjusted water with desired pH and redox potential.

In the above invention (Invention 1, 2), the cleaning water quality monitoring mechanism may preferably have an inert gas concentration measuring means, and the control means may be preferably capable of controlling the inert gas dissolution mechanism based on a measurement value of the cleaning water quality monitoring mechanism (Invention 3).

According to the invention (Invention 3), on the basis of the measurement result of the inert gas concentration of the pH/redox potential-adjusted water measured with the cleaning water quality monitoring mechanism, the control means can control the dissolution amount of the inert gas so that the inert gas concentration falls within a desired range, and it is thereby possible to stabilize the properties of the pH/redox potential-adjusted water.

In the above invention (Invention 1 to 3), the pH adjuster may be preferably one or more selected from hydrochloric acid, nitric acid, acetic acid, and $CO_2$ gas, the redox potential adjuster may be preferably one or more selected from oxalic acid, hydrogen sulfide, potassium iodide, and hydrogen gas, and the inert gas may be preferably one or more selected from nitrogen, argon, and helium (Invention 4).

According to the invention (Invention 4), the pH and redox potential of the pH/redox potential-adjusted water can be adjusted by appropriately selecting from the above options, and the cleaning water can be stabilized by selecting the inert gas.

In the above invention (Invention 1 to 4), the pH adjuster or the redox potential adjuster may be preferably a liquid, and the pH adjuster addition mechanism or the redox potential adjuster addition mechanism may preferably include a pump that supplies the liquid pH adjuster or redox potential adjuster or a pressurizing and pushing-out means that uses an inert gas to push out and supply the liquid pH adjuster or redox potential adjuster from a tank that stores the liquid pH adjuster or redox potential adjuster (Invention 5).

According to the invention (Invention 5), the addition of a very small amount of the liquid pH adjuster and redox potential adjuster can be stably controlled, and it is thus possible to produce the adjusted water with desired pH and redox potential.

In the above invention (Invention 1 to 5), the pH adjuster or the redox potential adjuster may be preferably a gas, and the pH adjuster addition mechanism or the redox potential adjuster addition mechanism may be preferably a gas dissolution means using a gas-permeable membrane module or a direct gas-liquid contactor (Invention 6).

According to the invention (Invention 6), the dissolution of a very small amount of the gaseous pH adjuster and redox potential adjuster can be stably controlled, and it is thus possible to produce the adjusted water with desired pH and redox potential.

In the above invention (Invention 1 to 6), the inert gas dissolution mechanism may be preferably a gas dissolution means using a gas-permeable membrane module or a direct gas-liquid contactor (Invention 7).

According to the invention (Invention 7), the inert gas can be efficiently dissolved.

In the above invention (Invention 1 to 7), the produced pH/redox potential-adjusted water may preferably have a pH of 0 to 5, an redox potential of −0.4 to +0.4 V, and a dissolved oxygen concentration of 50 ppb or less (Invention 8).

According to the invention (Invention 8), the production device can be obtained, which adjusts the pH/redox potential within the above ranges thereby to produce the pH/redox potential-adjusted water suitable for semiconductor wafers as the cleaning targets on which chromium group elements such as molybdenum are exposed.

In the above invention (Invention 1 to 8), a cleaning target of the pH/redox potential-adjusted water may be preferably a semiconductor material on which a chromium group element is partially or entirely exposed (Invention 9). It is particularly suitable when the chromium group element is molybdenum (Invention 10).

According to the invention (Invention 9, 10), it is possible to prepare the pH/redox potential-adjusted water having the pH and redox potential that are able to suppress the corrosion of transition metals such as molybdenum and other chromium group elements in accordance with the type of the transition metal, and the pH/redox potential-adjusted water is therefore suitable for cleaning semiconductor materials on which such chromium group elements are exposed.

Advantageous Effect of the Invention

According to the production device for pH/redox potential-adjusted water of the present invention, a trace amount of hydrogen peroxide contained in the ultrapure water is removed thereby to lower the redox potential, subsequently the pH and the redox potential are adjusted to desired ones, further the provision of the degassing mechanism allows the dissolved gas in the pH/redox potential-adjusted water as the cleaning water to be removed as much as possible, and then the inert gas is dissolved in the pH/redox potential-adjusted water; therefore, the properties of the pH/redox potential-adjusted water can be stabilized. Through these operations, it is possible to achieve the prevention of static charge of wafers and further suppression of the dissolution of chromium group elements such as molybdenum that are partially or entirely exposed on the wafer surface.

EMBODIMENTS FOR CARRYING OUT THE INVENTION

First Embodiment

Hereinafter, the first embodiment of a production device for pH/redox potential-adjusted water of the present invention will be described in detail with reference to the accompanying drawings.

«Production Device for pH/Redox Potential-Adjusted Water»

Figure 1:
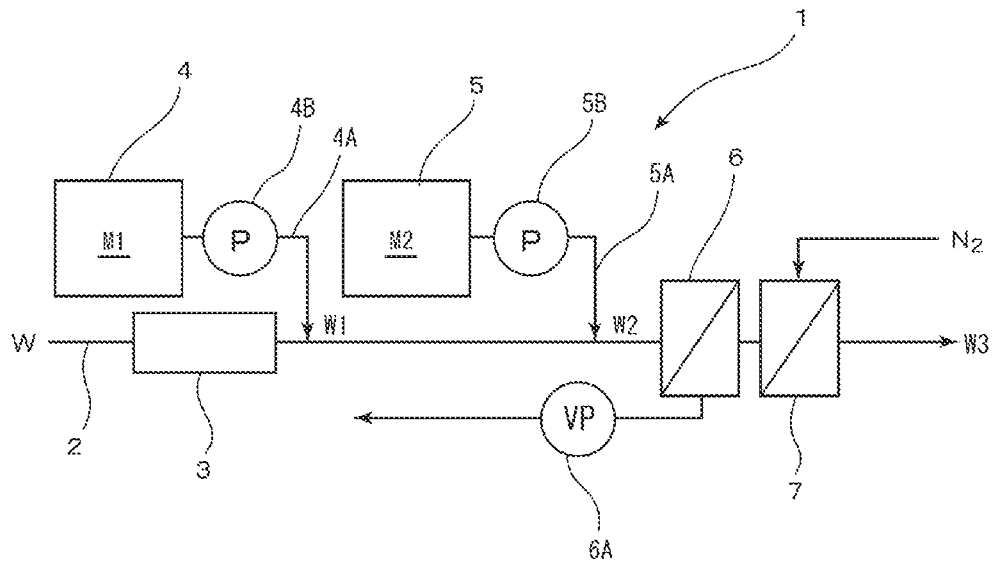
FIG. 1 is a schematic diagram illustrating a production device for pH/redox potential-adjusted water according to a first embodiment of the present invention.

FIG. 1 illustrates a production device for pH/redox potential-adjusted water according to the first embodiment. In FIG. 1, a production device for pH/redox potential-adjusted water 1 includes a platinum group metal-supporting resin column 3 as the hydrogen peroxide removal mechanism provided in a supply line 2 of ultrapure water W, a pH adjuster tank 4 as the pH adjuster addition mechanism provided downstream the platinum group metal-supporting resin column 3 via a supply pipe 4A equipped with a pump 4B, and a redox potential adjuster tank 5 as the redox potential adjuster addition mechanism provided downstream the platinum group metal-supporting resin column 3 via a supply pipe 5A equipped with a pump 5B. A membrane-type degassing device 6 as the degassing mechanism is provided downstream the pH adjuster tank 4 and the redox potential adjuster tank 5, and a vacuum pump (VP) 6A is connected to the gas-phase side of the membrane-type degassing device 6. A gas-dissolving membrane 7 as the inert gas dissolution mechanism is disposed downstream the membrane-type degassing device 6, and the gas-phase chamber side of the gas-dissolving membrane 7 is connected to a gas source of $N_2$ as the inert gas. A cleaning water quality monitoring mechanism (not illustrated) is provided downstream the gas-dissolving membrane 7 of the supply line 2. The cleaning water quality monitoring mechanism includes a pH meter as a pH measuring means, an ORP meter as a redox potential measuring means, and an inert gas concentration measuring means and is connected to a control means (not illustrated). The control means is capable of controlling the pump 4B of the pH adjuster tank 4, the pump 5B of the redox potential adjuster tank 5, and the gas-dissolving membrane 7 based on the measurement values of the cleaning water quality monitoring mechanism.

<Ultrapure Water>

In the present embodiment, preferred properties of the ultrapure water W as the raw water may be, for example, resistivity: 18.1 MΩ·cm or more, fine particles: 1000 particles/L or less with a particle diameter of 50 nm or more, viable bacteria: 1 bacterium/L or less, TOC (Total Organic Carbon): 1 μg/L or less, total silicon: 0.1 μg/L or less, metals: 1 ng/L or less, ions: 10 ng/L or less, hydrogen peroxide; 30 μg/L or less, and water temperature: 25±2° C.

<Hydrogen Peroxide Removal Mechanism>

In the present embodiment, the platinum group metal-supporting resin column 3 is preferably used as the hydrogen peroxide removal mechanism.

(Platinum Group Metal)

In the present embodiment, examples of the platinum group metal supported on the platinum group metal-supporting resin used in the platinum group metal-supporting resin column 3 include ruthenium, rhodium, palladium, osmium, iridium, and platinum. One type of these platinum group metals can be used alone, two or more types can be used in combination, one or more alloys of two or more types can be used, or a refined product of mixture produced naturally can be used without being separated into a single body. Among these, one type or a mixture of two or more types of platinum, palladium, and platinum/palladium alloy can be preferably used because of strong catalytic activity. Nano-order fine particles of these metals can be particularly preferably used.

(Carrier Resin)

In the platinum group metal-supporting resin column 3, any of ion exchange resins can be used as the carrier resin for supporting the platinum group metal. Among these, an anion exchange resin can be used particularly preferably. A platinum-based metal is negatively charged, so it is stably supported on the anion exchange resin and is less likely to be removed. The exchange groups of the anion exchange resin may be preferably in the OH form. The OH-type anion exchange resin has an alkaline resin surface, which promotes the decomposition of hydrogen peroxide.

<pH Adjuster Feeding Mechanism and Redox Potential Adjuster Feeding Mechanism>

In the present embodiment, these feeding devices are not particularly limited, and general chemical agent feeding devices can be used. When the pH adjuster or the redox potential adjuster is a liquid, it is sufficient to provide the pump 4B, 5B as in the present embodiment, and a diaphragm pump or the like can be used as the pump 4B, 5B. Additionally or alternatively, a pressurizing and pushing-out type pump can also be preferably used, which is configured such that a closed container is filled with the pH adjuster or the redox potential adjuster together with an inert gas such as $N_2$ gas and the adjuster is pushed out by the pressure of the inert gas. On the other hand, when the pH adjuster or the redox potential adjuster is a gas, a direct gas-liquid contactor such as a gas-dissolving membrane module or an ejector can be used.

<pH Adjuster>

In the present embodiment, the pH adjuster to be fed from the pH adjuster tank 4 is not particularly limited, and when adjusting the pH to lower than 7, a liquid such as hydrochloric acid, nitric acid, sulfuric acid, or acetic acid and a gas such as $CO_2$ gas can be used. When adjusting the pH to 7 or higher, ammonia, sodium hydroxide, potassium hydroxide, TMAH, or the like can be used. When the pH/redox potential-adjusted water is used, for example, as the cleaning water for wafers on which chromium group elements such as molybdenum are exposed, it may be preferred to make the cleaning water acidic (lower than pH 7). In this case, therefore, a liquid such as hydrochloric acid, nitric acid, sulfuric acid, or acetic acid and a gas such as $CO_2$, for example, may be preferably used as the pH adjuster.

<Redox Potential Adjuster>

In the present embodiment, the redox potential adjuster to be fed from the redox potential adjuster tank 5 is not particularly limited, but when adjusting the redox potential to be high (positive side), it may be preferred to use a liquid such as hydrogen peroxide water or a gas such as ozone gas or oxygen gas. On the other hand, when adjusting the redox potential to be low, it may be preferred to use a liquid such as oxalic acid, hydrogen sulfide, or potassium iodide or a gas such as hydrogen. When the pH/redox potential-adjusted water is used, for example, as the cleaning water for wafers on which chromium group elements such as molybdenum are exposed, it may be preferred to adjust the redox potential to be low (negative side) in order to suppress the dissolution of these materials. In this case, therefore, oxalic acid, hydrogen sulfide, potassium iodide, and hydrogen gas, for example, may be preferably used as the redox potential adjuster.

<Membrane-Type Degassing Device>

In the present embodiment, the membrane-type degassing device 6 for use may be configured such that pH/redox potential-adjusted water W2 is flowed through one side (liquid-phase side) of a degassing membrane and the other side (gas-phase side) is evacuated with the vacuum pump (VP) 6A thereby to allow the dissolved gas such as dissolved oxygen to pass through the degassing membrane and move to the gas-phase chamber, thus removing the dissolved gas. The degassing membrane may be a membrane that is permeable to gases such as oxygen, nitrogen, and steam but impermeable to water. Examples of such membranes include silicon rubber-based, polytetrafluoroethylene-based, polyolefin-based, and polyurethane-based ones. Various commercially available ones can be used as the degassing membrane.

<Gas-Dissolving Membrane>

In the present embodiment, the gas-dissolving membrane 7 may be configured such that the pH/redox potential-adjusted water W2 is flowed through one side (liquid-phase side) of the gas-dissolving membrane and the other side (gas-phase side) is supplied with $N_2$ gas thereby to dissolve the inert gas in the pH/redox potential-adjusted water W2. The inert gas is not limited to $N_2$ gas, and argon, helium, etc. can also be suitably used as the inert gas.

«Method of Producing pH/Redox Potential-Adjusted Water»

The description will now be made below for a method of producing highly-pure pH/redox potential-adjusted water using the production device for pH/redox potential-adjusted water of the present embodiment having the configuration as described above.

The ultrapure water W generally contains about several tens of ppb of hydrogen peroxide, so in order to accurately control the redox potential of the cleaning water, hydrogen peroxide in the ultrapure water W has to be preliminarily removed. To this end, first, the ultrapure water W as the raw water is supplied from the supply line 2 to the platinum group metal-supporting resin column 3. The platinum group metal-supporting resin column 3 uses the catalytic action of the platinum group metal to decompose and remove the hydrogen peroxide in the ultrapure water W, that is, serves as a hydrogen peroxide removal mechanism.

Then, into this ultrapure water W, the pH adjuster is fed from the pH adjuster tank 4 through the supply pipe 4A with the pump 4B to prepare pH-adjusted water W1, and subsequently the redox potential adjuster is fed from the redox potential adjuster tank 5 through the supply pipe 5A with the pump 5B to prepare the pH/redox potential-adjusted water W2. Here, when the cleaning water is prepared for wafers on which chromium group elements such as molybdenum are exposed, the feeding amounts of the pH adjuster and the redox potential adjuster may be controlled so that the adjusted water W2 has a pH of 0 to 5 and a redox potential of −0.4 to +0.4 V.

The reason why the above pH and redox potential of the adjusted water W2 for cleaning wafers on which chromium group elements such as molybdenum are exposed should be controlled within the above ranges is as follows. That is, according to the Pourbaix diagram of molybdenum, which shows which state of chemical species of the metal is most stable in aqueous solution under a given potential-pH condition, it is found that molybdenum dissolves under an alkaline condition regardless of the differences in the pH and redox potential of the aqueous solution. On the other hand, under an acidic condition, it can be read that the behavior of dissolution/passivation differs depending on the differences in the pH and redox potential of the aqueous solution. Fortunately, however, the inventor of the present invention has found that the dissolution of molybdenum is less likely to occur as the pH lowers, from immersion tests for wafers with molybdenum films in which the pH and the hydrogen peroxide concentration are varied. It has also been found that even under an acidic condition, the higher the hydrogen peroxide concentration (the higher the redox potential), the larger the dissolution amount of molybdenum. It has further been found that the dissolved oxygen in the treatment liquid also promotes the dissolution of molybdenum. From these results, it can be said that it is necessary to control the redox potential to an optimum value even under an acidic condition. Thus, in order to minimize the corrosive dissolution of transition metals, in particular chromium group elements (molybdenum), that are partially or entirely exposed on wafers, it is necessary to control both the concentrations of the pH adjuster and the redox potential adjuster so that not only the pH but also the redox potential of the cleaning liquid becomes an optimum value, reduce the dissolved oxygen concentration of the cleaning water as much as possible, and supply the pH/redox potential-adjusted water without increasing the dissolved oxygen concentration.

Subsequently, the pH/redox potential-adjusted water W2 is supplied to the membrane-type degassing device 6. In the membrane-type degassing device 6, by flowing the pH/redox potential-adjusted water W2 through the liquid-phase chamber side of the liquid-phase chamber and the gas-phase chamber, which are composed of a hydrophobic gas-permeable membrane, and reducing the pressure in the gas-phase chamber with the vacuum pump (VP) 6A, the dissolved gases such as dissolved oxygen contained in the pH/redox potential-adjusted water W2 are removed by being moved to the gas-phase chamber through the hydrophobic gas-permeable membrane. This allows the degassed, adjusted water to be obtained in which the dissolved oxygen concentration of the pH/redox potential-adjusted water W2 is reduced to a very low level. Thus, the pH/redox potential-adjusted water W2 is obtained and then degassed without directly degassing the pH adjuster and the redox potential adjuster, and it is thereby possible to reduce risks such as chemical solution leakage when these chemical agents are vacuum-degassed. Finally, stabilized pH/redox potential-adjusted water (stabilized, adjusted water) W3 can be produced by supplying $N_2$ gas from the gas-dissolving membrane 7 to the degassed, adjusted water to stabilize its properties.

The pH and redox potential of the stabilized, adjusted water W3 are measured with the cleaning water quality monitoring mechanism provided in the supply line 2 downstream the gas-dissolving membrane 7, and the cleaning water quality monitoring mechanism monitors whether or not the stabilized, adjusted water W3 has desired pH and redox potential. The pH and redox potential of the stabilized, adjusted water W3 fluctuate even with slight variations in the supply amount of the ultrapure water W, and the control device can therefore control the pump 4B of the pH adjuster tank 4 and the pump 5B of the redox potential adjuster tank thereby to control the feeding amounts of the pH adjuster and the reduction potential adjuster so that the stabilized, adjusted water W3 has the desired pH and redox potential. Additionally or alternatively, the inert gas concentration measuring means may be used to confirm that the inert gas concentration of the stabilized, adjusted water W3 is at a predetermined value. The control of the pH and redox potential with such a control device can be performed by feedback control such as PI control or PID control or by other well-known methods.

Second Embodiment

Then, the second embodiment of a production device for pH/redox potential-adjusted water of the present invention will be described in detail with reference to the accompanying drawings. The production device for pH/redox potential-adjusted water of the second embodiment basically has the same configuration as that of the previously described first embodiment, so the same configurations are denoted with the same reference numerals, and the detailed description will be omitted.

«Production Device for pH/Redox Potential-Adjusted Water»

Figure 2:
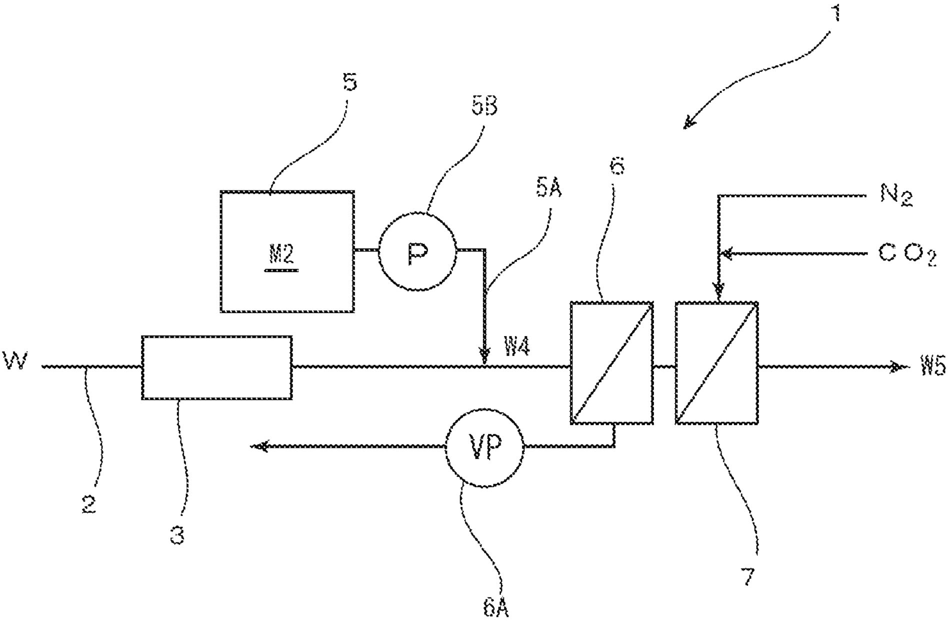
FIG. 2 is a schematic diagram illustrating a production device for pH/redox potential-adjusted water according to a second embodiment of the present invention.

FIG. 2 illustrates a production device for pH/redox potential-adjusted water according to the second embodiment. In FIG. 2, a production device for pH/redox potential-adjusted water 1 includes a platinum group metal-supporting resin column 3 as the hydrogen peroxide removal mechanism provided in a supply line 2 of ultrapure water W and a redox potential adjuster tank 5 provided downstream the platinum group metal-supporting resin column 3 via a supply pipe 5A equipped with a pump 5B. A membrane-type degassing device 6 is provided downstream the redox potential adjuster tank 5, and a vacuum pump (VP) 6A is connected to the gas-phase side of the membrane-type degassing device 6. A gas-dissolving membrane 7 is disposed downstream the membrane-type degassing device 6, and the gas-phase chamber side of the gas-dissolving membrane 7 is connected to a gas source of $N_2$ as the inert gas and a gas source of carbon dioxide gas as the pH adjuster. A cleaning water quality monitoring mechanism (not illustrated) is provided downstream the gas-dissolving membrane 7 of the supply line 2. The cleaning water quality monitoring mechanism includes a pH meter as a pH measuring means, an ORP meter as a redox potential measuring means, and an inert gas concentration measuring means and is connected to a control means (not illustrated). The control means is capable of controlling the pump 5B of the redox potential adjuster tank 5 and the gas-dissolving membrane 7 based on the measurement values of the cleaning water quality monitoring mechanism.

<Gas-Dissolving Membrane>

In the present embodiment, the gas-dissolving membrane 7 may be configured such that the ultrapure water W is flowed through one side (liquid-phase side) of the gas-dissolving membrane and the other side (gas-phase side) is supplied with $N_2$ gas and carbon dioxide gas ($CO_2$) thereby to dissolve the inert gas and the carbon dioxide gas in the cleaning water. Here, by adjusting the partial pressures of the $N_2$ gas and the carbon dioxide gas, it is possible to adjust the amount of carbon dioxide gas dissolved in the cleaning water, that is, the pH.

«Method of Producing pH/Redox Potential-Adjusted Water»

The description will now be made below for a method of producing highly-pure adjusted water using the production device for pH/redox potential-adjusted water of the present embodiment having the configuration as described above.

First, the ultrapure water W as the raw water is supplied from the supply line 2 to the platinum group metal-supporting resin column 3. The platinum group metal-supporting resin column 3 uses the catalytic action of the platinum group metal to decompose and remove hydrogen peroxide in the ultrapure water W, that is, serves as a hydrogen peroxide removal mechanism.

Then, the redox potential adjuster is fed into the ultrapure water W from the redox potential adjuster tank 5 through the supply pipe 5A with the pump 5B to prepare redox potential-adjusted water W4. Here, when the cleaning water is prepared for wafers on which chromium group elements such as molybdenum are exposed, the feeding amount may be controlled so that the redox potential becomes −0.4 to +0.4 V.

Subsequently, the redox potential-adjusted water W4 is supplied to the membrane-type degassing device 6. In the membrane-type degassing device 6, by flowing the redox potential-adjusted water W4 through the liquid-phase chamber side of the liquid-phase chamber and the gas-phase chamber, which are composed of a hydrophobic gas-permeable membrane, and reducing the pressure in the gas-phase chamber with the vacuum pump (VP) 6A, the dissolved gases such as dissolved oxygen contained in the redox potential-adjusted water W4 are removed by being moved to the gas-phase chamber through the hydrophobic gas-permeable membrane. This can reduce the dissolved oxygen concentration of the redox potential-adjusted water W4 to a very low level.

Finally, stabilized pH/redox potential-adjusted water (stabilized, adjusted water) W5 can be obtained by dissolving $N_2$ gas and carbon dioxide gas in the redox potential-adjusted water W4 from the gas-dissolving membrane 7 to adjust and stabilize the pH of the redox potential-adjusted water W4. Here, when the cleaning water is prepared for wafers on which chromium group elements such as molybdenum are exposed, the carbon dioxide gas as the pH adjuster may be used to control the partial pressures of the supplied $N_2$ gas and carbon dioxide gas so that the stabilized, adjusted water W5 has a pH of 0 to 5.

The pH and redox potential of the stabilized, adjusted water W5 are measured with the cleaning water quality monitoring mechanism provided in the supply line 2, and the cleaning water quality monitoring mechanism monitors whether or not the stabilized, adjusted water W5 has desired pH and redox potential. The pH and the redox potential fluctuate even with slight variations in the supply amount of the ultrapure water W, and the control device can therefore control the pump 5B of the redox potential adjuster tank 5 and the amounts and partial pressures of the gases supplied to the gas-dissolving membrane 7, thereby to control the feeding amount of the reduction potential adjuster and the dissolution amount of the carbon dioxide gas so that the stabilized, adjusted water W5 has the desired pH and redox potential. The control of the pH and redox potential with such a control device can be performed by feedback control such as PI control or PID control or by other well-known methods. Thus, in the case in which the pH adjuster or the redox potential adjuster is a gas, its dissolution can be performed in the gas-dissolving membrane 7 at the final stage thereby to suppress fluctuations in the gas concentration to a minimum level even when the gas flows through a PFA pipe or the like.

While the present invention has been described based on the above embodiments with reference to the accompanying drawings, the present invention is not limited to the above embodiments, and various modifications are possible. For example, in the second embodiment, carbon dioxide gas ($CO_2$), which is a gas, is used as the pH adjuster, so the dissolution of the pH adjuster is performed in the gas-dissolving membrane 7 downstream the membrane-type degassing device 6, but when a gas (e.g., hydrogen gas) is used as the redox potential adjuster, the configuration may be modified such that the dissolution of the gaseous redox potential adjuster is similarly performed in the gas-dissolving membrane 7 downstream the membrane-type degassing device 6. Additionally or alternatively, the supply line 2 of the pH/redox potential-adjusted water can be provided with other meters such as a flowmeter, a thermometer, a pressure gauge, and a gas concentration meter at arbitrary locations. Additionally or alternatively, the pH adjuster tank 4 and the redox potential adjuster tank 5 may be provided with chemical solution flow rate adjusting valves.

EXAMPLES

The present invention will be described in more detail with the following specific examples.

(Confirmation Tests for Influence of pH of Treatment Liquid on Dissolution of Molybdenum)

Example 1

Figure 3:
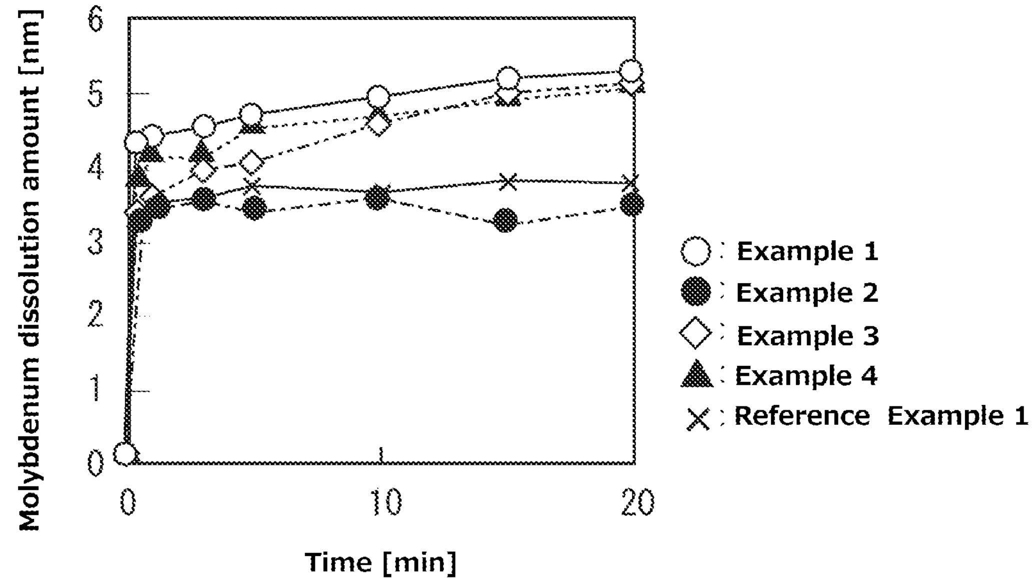
FIG. 3 is a graph illustrating the dissolution rate of molybdenum depending on the difference in cleaning water in Examples 1 to 4 and Reference Example 1.

A square test piece of 20 mm×20 mm was cut out from a 300 mmφ wafer with a molybdenum (Mo) film obtained by the PVD method. When the test piece was immersed in a hydrochloric acid aqueous solution (hydrochloric acid concentration: 100 ppm, dissolved oxygen concentration: about 8 ppm (open to the atmosphere), pH of about 2), obtained by dissolving hydrochloric acid in ultrapure water, at room temperature for 20 minutes, the change over time of the molybdenum concentration in the treatment liquid was analyzed by ICP-MS, and the dissolution amount of molybdenum was calculated. The results are illustrated in FIG. 3.

Example 2

Likewise Example 1, when the test piece was immersed in an ammonia aqueous solution (ammonia concentration: 10 ppm, dissolved oxygen concentration: about 8 ppm (open to the atmosphere), pH of about 10), obtained by dissolving ammonia ($NH_4OH$) in ultrapure water, at room temperature for 20 minutes, the change over time of the molybdenum concentration in the treatment liquid was analyzed by ICP-MS, and the dissolution amount of molybdenum was calculated. The results are also illustrated in FIG. 3.

Example 3

Likewise Example 1, when the test piece was immersed in a sodium hydroxide aqueous solution (sodium hydroxide concentration: 1000 ppm, dissolved oxygen concentration: about 8 ppm (open to the atmosphere), pH of about 12), obtained by dissolving sodium hydroxide (NaOH) in ultrapure water, at room temperature for 20 minutes, the change over time of the molybdenum concentration in the treatment liquid was analyzed by ICP-MS, and the dissolution amount of molybdenum was calculated. The results are also illustrated in FIG. 3.

Example 4

Likewise Example 1, when the test piece was immersed in a hydrogen peroxide aqueous solution (hydrogen peroxide concentration: 10 ppm, dissolved oxygen concentration: about 8 ppm (open to the atmosphere), pH of 6), obtained by dissolving hydrogen peroxide ($H_2O_2$) in ultrapure water, at room temperature for 20 minutes, the change over time of the molybdenum concentration in the treatment liquid was analyzed by ICP-MS, and the dissolution amount of molybdenum was calculated. The results are also illustrated in FIG. 3.

Reference Example 1

Likewise Example 1, when the test piece was immersed in ultrapure water (dissolved oxygen concentration: about 8 ppm (open to the atmosphere)) at room temperature for 20 minutes, the change over time of the molybdenum concentration in the treatment liquid was analyzed by ICP-MS, and the dissolution amount of molybdenum was calculated. The results are also illustrated in FIG. 3.

As apparent from FIG. 3, it has been found that dissolution of molybdenum of about 3 to 4 nm occurs in the test piece immediately after the immersion regardless of the treatment liquid. The dissolution amount of molybdenum immediately after the immersion is almost the same regardless of the difference in the properties of the treatment liquid, and it is therefore considered that this is due to the dissolution of a molybdenum compound that dissolves only in $H_2O$.

(Verification Tests for Dependency of Molybdenum Dissolution Rate on pH and Oxidant Concentration)

Example 5

Figure 4:
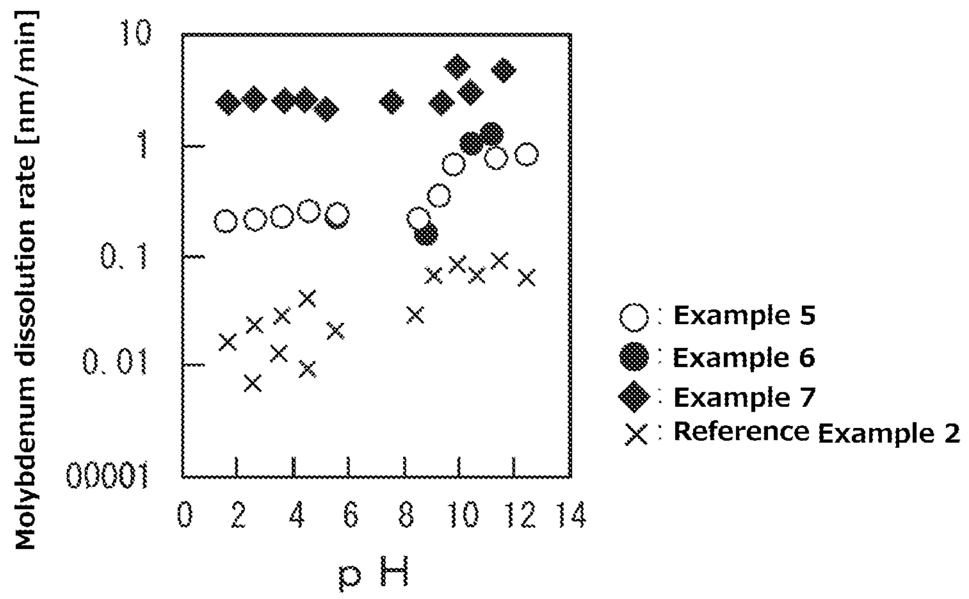
FIG. 4 is a graph illustrating the relationship between the dissolution rate of molybdenum and the pH depending on the difference in the hydrogen peroxide concentration of cleaning water in Examples 5 to 7 and Reference Example 2.

A square test piece of 20 mm×20 mm was cut out from a 300 mmφ wafer with a molybdenum (Mo) film obtained by the PVD method. When the test piece was immersed in each of hydrogen peroxide aqueous solutions (hydrogen peroxide concentration: 80 ppm, dissolved oxygen concentration: about 8 ppm (open to the atmosphere)), obtained by dissolving hydrogen peroxide ($H_2O_2$) in ultrapure water with varying pH, at room temperature for 20 minutes, the change over time of the molybdenum concentration in the treatment liquid was analyzed by ICP-MS, and the dissolution rate of molybdenum was calculated. The relationship between the dissolution rate and the pH is illustrated in FIG. 4.

Example 6

Likewise Example 5, when the test piece was immersed in each of hydrogen peroxide aqueous solutions with a hydrogen peroxide concentration of 100 ppm and varying pH at room temperature for 20 minutes, the change over time of the molybdenum concentration in the treatment liquid was analyzed by ICP-MS, and the dissolution rate of molybdenum was calculated. The relationship between the dissolution rate and the pH is illustrated in FIG. 4.

Example 7

Likewise Example 5, when the test piece was immersed in each of hydrogen peroxide aqueous solutions with a hydrogen peroxide concentration of 1000 ppm and varying pH at room temperature for 20 minutes, the change over time of the molybdenum concentration in the treatment liquid was analyzed by ICP-MS, and the dissolution rate of molybdenum was calculated. The relationship between the dissolution rate and the pH is illustrated in FIG. 4.

Reference Example 2

Likewise Example 5, when the test piece was immersed in each of ultrapure water samples (dissolved oxygen concentration: about 8 ppm (open to the atmosphere)) with varying pH at room temperature for 20 minutes, the change over time of the molybdenum concentration in the treatment liquid was analyzed by ICP-MS, and the dissolution rate of molybdenum was calculated. The relationship between the dissolution rate and the pH is illustrated in FIG. 4.

As apparent from FIG. 4, it is found that regardless of the pH of the treatment liquid, the higher the hydrogen peroxide concentration, the faster the dissolution rate of molybdenum. It can also be confirmed that when the hydrogen peroxide concentration in the treatment liquid is the same, the dissolution rate of molybdenum tends to be faster in an alkaline solution than in an acidic solution. From these results, it is considered that molybdenum dissolves in an aqueous solution through the following reactions of Formulae (1) to (3).

$$Mo+2H_2O_2 \rightarrow MoO_2+4H^++4e^- \quad (1)$$

$$MoO_2+H_2O \rightarrow MoO_3+2H^++2e^- \quad (2)$$

$$MoO_3+H_2O \rightarrow HMoO_4^-+H^+ \quad (3)$$

From these results, it is found that the dissolution of molybdenum is promoted under the presence of an oxidant (the redox potential adjuster is on the positive side) regardless of the pH. On the other hand, also in the absence of an oxidant (Reference Example 2), the dissolution rate of molybdenum is faster under an alkaline condition than under an acidic condition. This appears to be because the dissolved oxygen in the treatment liquid, which increases due to dissolution of air in the treatment liquid, serves as an oxidant to oxidize and dissolve molybdenum.

(Verification Tests for Dependency of Molybdenum Dissolution Rate on Dissolved Oxygen Concentration of Treatment Liquid)

Example 8

The dissolution rate of molybdenum in the treatment liquids of Examples 1 to 4 having a dissolved oxygen concentration of about 8 ppm and different pHs was calculated. The relationship between the dissolution rate and the pH is illustrated in FIG. 5.

Example 9

Likewise Example 8, when the test piece was immersed in each of treatment liquids, degassed to have a dissolved oxygen concentration of about 30 ppb, at room temperature for 20 minutes, the change over time of the molybdenum concentration in the treatment liquid was analyzed by ICP-MS to measure the dissolution amount of molybdenum, and the dissolution rate of molybdenum was calculated based on the measurement results. The relationship between the dissolution rate and the pH is illustrated in FIG. 5.

Figure 5:
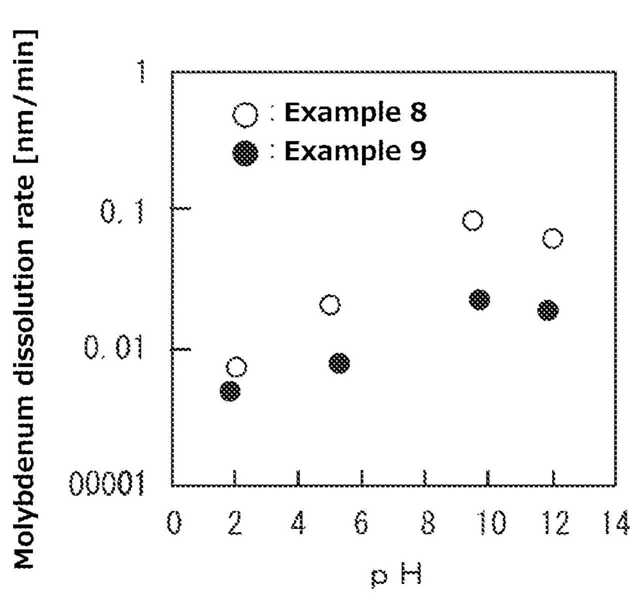
FIG. 5 is a graph illustrating the relationship between the dissolution rate of molybdenum and the pH depending on the difference in the dissolved oxygen concentration of cleaning water in Examples 8 and 9.

As apparent from FIG. 5, it is found that when the dissolved oxygen concentration in the treatment liquid is low, the dissolution rate of molybdenum decreases regardless of the pH of the treatment liquid. Also from this, it can be said that it is important to remove not only hydrogen peroxide but also dissolved oxygen in the treatment liquid in order to prevent the dissolution of molybdenum.

According to Examples 1 to 9, the cleaning water for the surfaces of semiconductor wafers on which chromium group elements (such as molybdenum) are partially or entirely exposed requires all of managing the pH, managing the oxidant (redox potential adjuster) concentration, and maintaining the dissolved oxygen concentration low, and it can thus be said that the production device for pH/redox potential-adjusted water of the present invention that can control all of these is preferred as the production device for such cleaning water.

DESCRIPTION OF REFERENCE NUMERALS

- 1 Production device for pH/redox potential-adjusted water
- 2 Supply line
- 3 Platinum group metal-supporting resin column (hydrogen peroxide removal mechanism)
- 4 pH adjuster tank
- 4A Supply pipe
- 4B Pump
- 5 Redox potential adjuster tank
- 5A Supply pipe
- 5B Pump
- 6 Membrane-type degassing device
- 6A Vacuum pump (VP)
- 7 Gas-dissolving membrane
- W Ultrapure water
- W1 pH-adjusted water
- W2 pH/redox potential-adjusted water
- W3 pH/redox potential-adjusted water (stabilized, adjusted water)
- W4 Redox potential-adjusted water
- W5 pH/redox potential-adjusted water (stabilized, adjusted water)

The invention claimed is:

1. A production device for adjusted water having pH and redox potential that produces adjusted water having a desired pH and a desired redox potential by adding a pH adjuster and a redox potential adjuster to ultrapure water, comprising:

a hydrogen peroxide removal mechanism provided in an ultrapure water supply line;

a pH adjuster addition mechanism and a redox potential adjuster addition mechanism that are provided downstream of the hydrogen peroxide removal mechanism;

a degassing mechanism provided downstream of the pH adjuster addition mechanism and/or the redox potential adjuster addition mechanism; and an inert gas dissolution mechanism provided downstream of the degassing mechanism, wherein the produced adjusted water having pH and redox potential has a pH of 0 to 5, a redox potential of −0.4 to +0.4 V, a dissolved oxygen concentration of 50 ppb or less, and a hydrogen peroxide concentration of 1000 ppm or less, and the production device further comprising:

a water quality monitoring mechanism configured for monitoring the pH, redox potential, and inert gas concentration of the adjusted water to determine whether or not the adjusted water has the desired pH and the desired redox potential; and a control device capable of stabilized control of the inert gas dissolution mechanism, the pH adjuster addition mechanism, and the redox potential adjuster addition mechanism based on measurements from the water quality monitoring mechanism so that the inert gas dissolution mechanism adjusts the inert gas concentration, the pH adjuster addition mechanism adjusts the pH, and the redox potential adjuster addition mechanism adjusts the redox potential, wherein the adjusted water having pH and redox potential produced is suitable for cleaning a semiconductor material on which molybdenum is partially or entirely exposed.

2. The production device for adjusted water having pH and redox potential according to claim 1, wherein the pH adjuster is one or more selected from the group consisting of hydrochloric acid, nitric acid, acetic acid, and $CO_2$ gas, the redox potential adjuster is one or more selected from the group consisting of oxalic acid, hydrogen sulfide, potassium iodide, and hydrogen gas, and the inert gas is one or more selected from the group consisting of nitrogen, argon, and helium.

3. The production device for adjusted water having pH and redox potential according to claim 1, wherein the pH adjuster or the redox potential adjuster is a liquid, and the pH adjuster addition mechanism or the redox potential adjuster addition mechanism includes a pump that supplies the liquid pH adjuster or redox potential adjuster or a pressurizing and pushing-out device configured to use an inert gas to push out and supply the liquid pH adjuster or redox potential adjuster from a tank that stores the liquid pH adjuster or redox potential adjuster.

4. The production device for adjusted water having pH and redox potential according to claim 1, wherein the pH adjuster or the redox potential adjuster is a gas, and the pH adjuster addition mechanism or the redox potential adjuster addition mechanism is a gas dissolution device comprising a gas-permeable membrane module or a direct gas-liquid contactor.

5. The production device for adjusted water having pH and redox potential according to claim 1, wherein the inert gas dissolution mechanism is a gas dissolution device comprising a gas-permeable membrane module or a direct gas-liquid contactor.

* * * * *